United States Patent
Yin et al.

(10) Patent No.: US 8,577,158 B2
(45) Date of Patent: Nov. 5, 2013

(54) METHODS AND APPARATUS FOR TEXTURE COMPRESSION USING PATCH-BASED SAMPLING TEXTURE SYNTHESIS

(75) Inventors: Peng Yin, Plainsboro, NJ (US); Jill MacDonald Boyce, Manalapan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 245 days.

(21) Appl. No.: 12/737,207

(22) PCT Filed: Jun. 27, 2008

(86) PCT No.: PCT/US2008/008050
§ 371 (c)(1),
(2), (4) Date: Dec. 17, 2010

(87) PCT Pub. No.: WO2009/157904
PCT Pub. Date: Dec. 30, 2009

(65) Prior Publication Data
US 2011/0091120 A1  Apr. 21, 2011

(51) Int. Cl.
G06K 9/36  (2006.01)
G06K 9/46  (2006.01)
G09G 5/00  (2006.01)

(52) U.S. Cl.
USPC .................. 382/232; 382/243; 345/582

(58) Field of Classification Search
USPC .................................. 345/581, 582
See application file for complete search history.

(56) References Cited

U.S. PATENT DOCUMENTS

| | | | | |
|---|---|---|---|---|
| 5,394,191 A * | 2/1995 | Sirat et al. | | 348/571 |
| 6,762,769 B2 * | 7/2004 | Guo et al. | | 345/582 |
| 7,606,435 B1 * | 10/2009 | Dumitras et al. | | 382/243 |
| 8,204,325 B2 * | 6/2012 | Segall et al. | | 382/243 |
| 2004/0218827 A1 | 11/2004 | Cohen et al. | | |
| 2005/0146539 A1 * | 7/2005 | Zhu et al. | | 345/639 |
| 2005/0243099 A1 * | 11/2005 | Dumitras et al. | | 345/582 |
| 2006/0039617 A1 * | 2/2006 | Makai et al. | | 382/232 |
| 2009/0003430 A1 * | 1/2009 | Sun et al. | | 375/240.01 |

FOREIGN PATENT DOCUMENTS

| | | |
|---|---|---|
| CN | 1173958 | 2/1998 |
| CN | 1659595 | 8/2005 |
| CN | 1882083 | 12/2006 |

OTHER PUBLICATIONS

Liang et al., "Real-Time Texture Synthesis by Patch-Based Sampling", ACM Transactions on Graphics, vol. 20, No. 3, Jul. 2001, pp. 127-150.
Ndjiki-Nya et al, "A Generic and Automatic Content-Based Approach for Improved H.264/MPEG4-AVC Video Coding", Image Processing, 2005, vol. 2, Genova, Italy, Sep. 11-14, 2005, pp. 874-877.
Flores et al., "A Method for Bit-Rate Reduction of Compressed Video Using Texture Analysis/Synthesis", Signal Processing Systems Design and Implementation, 2005, Athens, Greece, Nov. 2-4, 2005, pp. 467-472.
Wei, "Texture Synthesis by Fixed Neighborhood Searching", Nov. 2001, pp. 1-132.

(Continued)

*Primary Examiner* — Li Liu
(74) *Attorney, Agent, or Firm* — Robert D. Shedd; Vincent E. Duffy; James McKenzie (57) ABSTRACT

Methods and apparatus are provided for texture compression using patch-based sampling texture synthesis. An apparatus includes an encoder for encoding texture for a picture by synthesizing the texture. The encoder performs texture synthesis using a patch-based sampling method, thus determining "displacement vectors" indicating positions of patches in an input sample texture which are to be synthesized. At the encoder, both the input sample texture and information representing the "displacement vectors" are coded. At the decoder, the new patches are generated by directly using the "displacement vectors".

19 Claims, 5 Drawing Sheets

(56) References Cited

OTHER PUBLICATIONS

Efros et al., "Texture Synthesis by Non-Parametric Sampling", University of California, Berkeley, CA, vol. 2, Sep. 20-27, 1999, pp. 1033-1038.

Dumitras et al., "A Texture Replacement Method at the Encoder for Bit-Rate Reduction of Compressed Video", IEEE Transactionis on Circuits and Systems for Video Technology, vol. 13, No. 2, Feb. 2003, pp. 163-175.

International Search Report Dated: Aug. 24, 2009.

Wiegnad, Thomas, et al "Overview of the H.264/AVC Video Coding Standard" IEEE Transactions and Circuits and Systems for Video Technology, vol. 13, No. 7, Jul. 2003, pp. 560-576.

* cited by examiner

METHODS AND APPARATUS FOR TEXTURE COMPRESSION USING PATCH-BASED SAMPLING TEXTURE SYNTHESIS

This application claims the benefit, under 35 U.S.C. §365 of International Application PCT/US2008/08050, filed Jun. 27, 2008, which was published in accordance with PCT Article 21(2) on Dec. 30, 2009 in English.

TECHNICAL FIELD

The present principles relate generally to video coding and decoding and, more particularly, to a methods and apparatus for texture compression.

BACKGROUND

With the existence of many image and video coding standards, recommendations, and extensions thereof (hereinafter collectively referred to as video coding standards), texture compression is a technology that is not that well developed. First, most of the current video coding standards use transform-based methods to encode video pictures. To preserve the details of texture for a particular video picture, such methods require a significant number of bits, which is especially true when the image includes a large texture background.

In general, image areas can be classified as flat regions, edge regions, or texture regions. Most of the current video coding standards adopt transformation-based methods which are generally applied to a video picture, regardless of the types of regions contained in such a picture. When such transformation based methods are applied to a texture region of a video picture, a series of high frequency components are generated which are subsequently discarded, through an operation such as filtering. Hence, it is very difficult to preserve texture details during compression because such regions are typically associated with such high frequency components and such reflect such texture regions.

Although, texture synthesis is used in both computer vision and computer graphics applications, due to its high complexity, texture synthesis is not frequently used for image and video compression operations. In accordance with an approach directed to texture synthesis, the texture can be defined as some visual pattern on an infinite two-dimensional (2-D) plane which, at some scale, has a stationary distribution. The target of texture synthesis can be described as follows: given a particular texture sample, a new texture is synthesized that, when perceived by a human observer, appears to be generated by the same underlying stochastic process as the texture sample.

One way of performing a texture synthesis operation determines global statistics in feature space and sample images from the texture ensemble directly. This texture synthesis operation is a form of model-based coding. To perform such a texture synthesis operation at an encoder, an image is first analyzed for textures and the parameters for such textures are estimated and coded. At a decoder, these parameters are extracted from a data bit stream and are used to reconstruct the modeled textures. Specifically, textures are reconstructed at a decoder by determining a probability distribution from the extracted parameters. The drawback to this approach of texture synthesis is the high complexity, both at the encoder and decoder, required to analyze and reconstruct textures.

SUMMARY

These and other drawbacks and disadvantages of the prior art are addressed by the present principles, which are directed to methods and apparatus for texture compression using patch-based sampling texture synthesis.

According to an aspect of the present principles, there is provided an apparatus. The apparatus includes an encoder for encoding texture for a picture by synthesizing the texture. The encoder uses information to shift a decoding complexity operation to the encoder when synthesizing the texture using a patch-based sampling method.

According to another aspect of the present principles, there is provided a method. The method includes encoding texture for a picture by synthesizing the texture. The encoding step uses information to shift a decoding complexity operation to the encoder when synthesizing the texture using a patch-based sampling method.

According to yet another aspect of the present principles, there is provided an apparatus. The apparatus includes a decoder for decoding texture for a picture by synthesizing the texture. The decoder uses information configured to shift a decoding complexity operation to the encoder when synthesizing the texture using a patch-based sampling method.

According to a further aspect of the present principles, there is provided a method. The method includes decoding texture for a picture by synthesizing the texture. The decoding step uses information to shift a decoding complexity operation to the encoder when synthesizing the texture using a patch-based sampling method.

These and other aspects, features and advantages of the present principles will become apparent from the following detailed description of exemplary embodiments, which is to be read in connection with the accompanying drawings.

BRIEF DESCRIPTION OF THE DRAWINGS

The present principles can be better understood in accordance with the following exemplary figures, in which.

DETAILED DESCRIPTION

The present principles are directed to methods and apparatus for texture compression using patch-based sampling texture synthesis.

The present description illustrates the present principles. It will thus be appreciated that those skilled in the art in view of the detailed description of this invention will be able to devise various arrangements that, although not explicitly described or shown herein, embody the present principles.

All statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown, in which one of the skilled in the art can develop computer code from the various disclosures from the specification The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), a graphics processor ("GPU"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Moreover, it is to be appreciated that while one or more embodiments and/or implementations of the present principles are described herein with respect to the MPEG-4 AVC (ISO/IEC 14496-10) standard, the present principles are not limited to solely this standard and, thus, can be utilized with respect to other video coding standards, recommendations, and extensions thereof, including extensions of the MPEG-4 AVC standard, VC-1 (SMPTE 421M), while maintaining the spirit of the present principles.

As used herein, "high level syntax" refers to syntax present in the bitstream that resides hierarchically above the macroblock layer. For example, high level syntax, as used herein, can refer to, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

Figure 1:
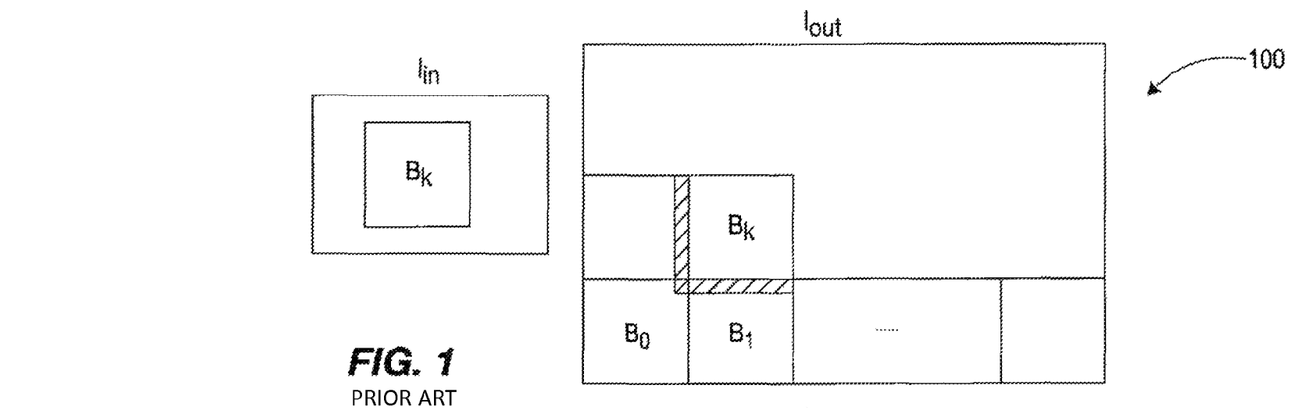
FIG. 1 is a diagrammatic illustration of a generalized patch-based sampling approach.

This application discloses and improves upon the alternative approaches to performing texture modeling called "patch-based sampling" which is different than the statistical modeling approaches of the prior art. This texture video coding approach involves the use of texture patches of an input sample texture as building blocks for constructing synthesized texture. Turning to FIG. 1, a diagrammatic illustration of a patch-based sampling approach in accordance with the prior art is indicated generally by the reference numeral 100.

In each step involved in the patching-based sampling approach of FIG. 1, a patch of the input sample texture $I_{in}$ is pasted into the synthesized texture $I_{out}$. To avoid mismatching features across patch boundaries, the new patch $B_k$ is selected based on the already pasted patches $\{B_0, \ldots B_{k-1}\}$. For simplicity, only square patches of a prescribed size $\omega_B \times \omega_B$ are used. The boundary zone of a texture patch is defined as a band of width $\omega_E$ along the boundary of the patch. The new patch overlaps with the old patches in the boundary zones. The new patch is selected by searching the input sample texture $I_{in}$ for all patches $\Psi_B$ whose boundary zone match the old patches using some predefined condition. The synthesizer randomly selects one patch from $\Psi_B$ and puts the selected patch into the synthesized texture $I_{out}$. The order of patch generation for an image is from bottom to top, left to right. It is to be noted that due to the randomness of the texture, the patching-based sampling approach 100 does not care what order is used, as long as a regular scanning order is performed. However, the encoder and decoder should use the same order.

The patching-based sampling approach of FIG. 1 can also be described as follows:

(a) Randomly choose a texture patch $B_0$ from the input sample texture $I_{in}$. Paste $B_0$ in the lower left corner of $I_{out}$. Set k=1.

(b) Form the set $\Psi_B$ of all texture patches from $I_{in}$ such that for each texture patch of $\Psi_B$, its boundary zone matches with that of the old neighboring patches.

(c) Randomly select an element from $\Psi_B$ as the k-th texture patch $B_k$. Paste $B_k$ onto the output texture $I_{out}$. Set k=k+1.

(d) Repeat step (b) and (c) until $I_{out}$ is fully covered.

(e) Perform blending in the boundary zones.

The blending step in (e) provides a smooth transition between adjacent texture patches after $I_{out}$ is fully covered with texture patches.

It is to be noted that the above algorithm is for unconstrained texture synthesis. To synthesize texture with borders, the border areas adjacent to the texture region will be considered as the boundary zones when searching $\Psi_B$.

When a patch-based sampling method is used for texture compression, only the input texture sample is coded at the encoder. At the decoder, the texture is reconstructed according to the above algorithm relating to the patching-based sampling approach of FIG. 1. The patch-based sampling approach outperforms the statistical model-based approach in both speed and quality. Nevertheless, the patch-based sampling approach still has several drawbacks including, but not limited to: (1) the decoder is more complicated than the encoder; (2) the speed of the decoder is constrained by searching $\Psi_B$, which is a time consuming operation; and (3) the performance of the codec depends on the searching algorithm, which is reliant upon the decoder configuration versus the encoder.

The present principles are directed to methods and apparatus for texture compression using patch-based sampling texture synthesis which are a better than the patch-based sampling method known in conjunction with FIG. 1. In contrast to most image and video coding standards, this invention can code textures using texture synthesis by patch-based sampling. Advantageously, and in contrast to the prior art, the present principles use information to implement real-time texture synthesis at the decoder.

In accordance with the present principles, complexity is moved from the decoder to the encoder. By using such a strategy, no search is required at the decoder, and the encoder will essentially determine the performance (e.g., compression efficiency).

Figure 2:
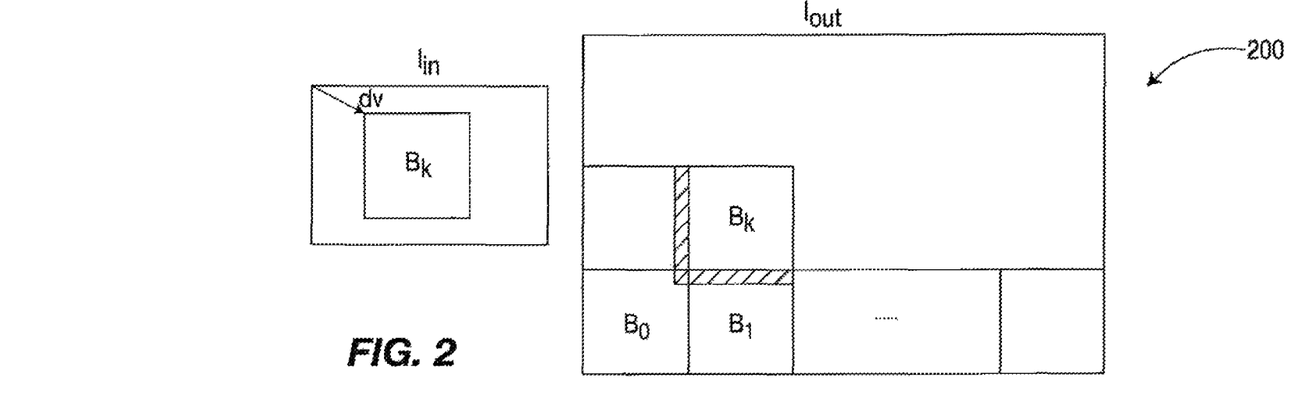
FIG. 2 is a diagrammatic illustration of a patch-based sampling approach in accordance with an embodiment of the present principles.

Turning to FIG. 2, a diagrammatic illustration of an exemplary patch-based sampling approach is indicated generally by the reference numeral 200. It is to be noted that the approach of FIG. 2 uses information for its patch-based sampling approach.

In an embodiment, the information used is a "displacement vector" which describes the position of the new patch $B_k$ within the input sample texture $I_{in}$. The displacement vector is defined as dv, as shown in FIG. 2. In the embodiment of FIG. 2, dv is the distance from the upper-left point of $B_k$ to that of $I_{in}$. This "displacement vector", in accordance with the present principles of the invention, differs from motion vectors used in motion compensation in current video compression standards and recommendations in that the reference picture is the input texture $I_{in}$ the displacement vector is a spatial displacement, unlike a conventional "motion vector" which, in general, refers to temporal displacement. Accordingly, the spatial displacement vector described herein in accordance with the present principles is also interchangeably referred to herein as "input texture spatial displacement vector". At the encoder, both the input sample texture and information representing a spatial displacement vector dv are coded. At the decoder, the new patch is generated by directly using the "displacement vector".

The input sample texture and the information representing the spatial displacement vector can be coded in any method, either lossy or lossless. In an embodiment, the input sample texture is coded lossily, using vector quantization and entropy coding, and code the displacement vector in a lossless manner, using Differential Pulse Code Modulation (DPCM) and entropy coding. Advantageously, embodiments of the present principles can be applied to any method based on patch-based sampling including, but not limited to, multi-resolution patch-based sampling texture synthesis where, in each resolution, the displacement vectors can be generated.

Figure 3:
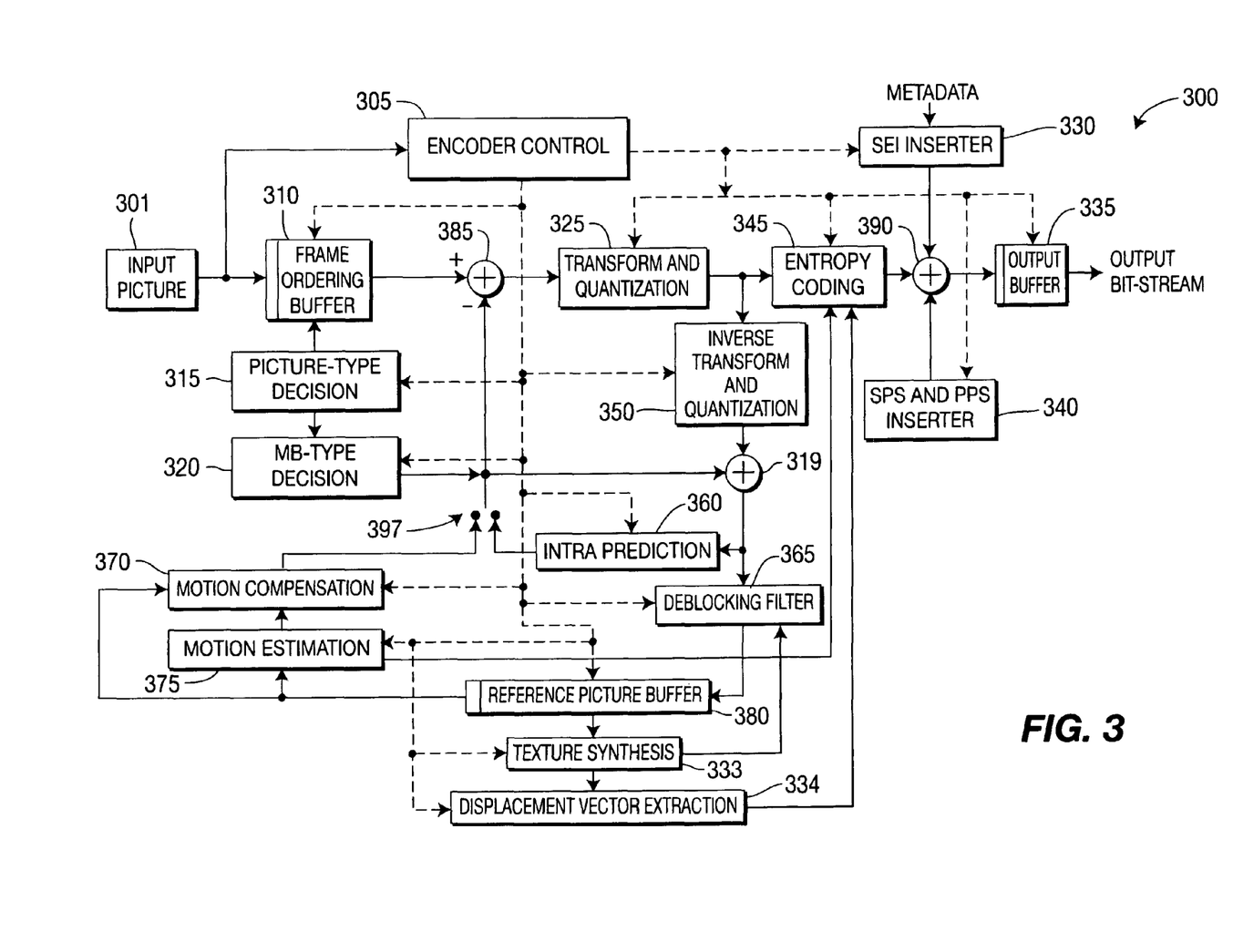
FIG. 3 is a block diagram for an exemplary video encoder to which the present principles can be applied, in accordance with an embodiment of the present principles.

Turning to FIG. 3, a video encoder capable of performing video encoding in accordance with the MPEG-4 AVC standard is indicated generally by the reference numeral 300.

The video encoder 300 includes a frame ordering buffer 310 having an output coupled with a non-inverting input of a combiner 385. An output of the combiner 385 is connected with a first input of a transformer and quantizer 325. An output of the transformer and quantizer 325 is connected with a first input of an entropy coder 345 and a first input of an inverse transformer and inverse quantizer 350. An output of the entropy coder 345 is connected with a first non-inverting input of a combiner 290. An output of the combiner 390 is connected with a first input of an output buffer 335.

A first output of an encoder controller 305 is coupled with a second input of the frame ordering buffer 310, a second input of the inverse transformer and inverse quantizer 350, an input of a picture-type decision module 315, an input of a macroblock-type (MB-type) decision module 320, a second input of an intra prediction module 360, a second input of a deblocking filter 365, a first input of a motion compensator 370, a first input of a motion estimator 375, a second input of a reference picture buffer 380, a first input of a texture synthesizer 333, and a first input of a displacement vector extractor 334.

A second output of the encoder controller 305 is coupled with a first input of a Supplemental Enhancement Information (SEI) inserter 330, a second input of the transformer and quantizer 325, a second input of the entropy coder 345, a second input of the output buffer 335, and an input of the Sequence Parameter Set (SPS) and Picture Parameter Set (PPS) inserter 340.

A first output of the picture-type decision module 315 is connected with a third input of a frame ordering buffer 310. A second output of the picture-type decision module 315 is connected with a second input of a macroblock-type decision module 320.

An output of the Sequence Parameter Set (SPS) and Picture Parameter Set (PPS) inserter 340 is connected with a third non-inverting input of the combiner 390.

An output of the inverse quantizer and inverse transformer 350 is connected with a first non-inverting input of a combiner 319. An output of the combiner 319 is connected with a first input of the intra prediction module 360 and a first input of the deblocking filter 365. An output of the deblocking filter 365 is with a first input of a reference picture buffer 380. A first output of the reference picture buffer 380 is connected with a second input of the motion estimator 375 and a third input of the motion compensator 370. A second output of the reference picture buffer 380 is connected with a second input of the texture synthesizer 333. A first output of the texture synthesizer 333 is connected with a third input of the deblocking filter 365. A second output of the texture synthesizer 333 is connected with a second input of the displacement vector extractor 334. An output of the displacement vector extractor 334 is connected with a third input of the entropy coder 345, for providing motion vectors thereto. A first output of the motion estimator 375 is connected with a second input of the motion compensator 370. A second output of the motion estimator 375 is connected with a fourth input of the entropy coder 345, for providing displacement vectors thereto. It is to be noted that, in an embodiment, the motion vectors and the displacement vectors can be coded similarly, as both can connote a magnitude and a direction.

An output of the motion compensator 370 is connected with a first input of a switch 397. An output of the intra prediction module 360 is connected with a second input of the switch 397. An output of the macroblock-type decision module 320 is connected with a third input of the switch 397. The third input of the switch 397 determines whether or not the "data" input of the switch (as compared to the control input, i.e., the third input) is to be provided by the motion compensator 370 or the intra prediction module 360. The output of the switch 397 is connected with a second non-inverting input of the combiner 319 and with an inverting input of the combiner 385.

Inputs of the frame ordering buffer 310 and the encoder controller 305 are available as input of the encoder 300, for receiving an input picture 301. Moreover, an input of the Supplemental Enhancement Information (SEI) inserter 330 is available as an input of the encoder 300, for receiving metadata. An output of the output buffer 335 is available as an output of the encoder 300, for outputting a bitstream.

Figure 4:
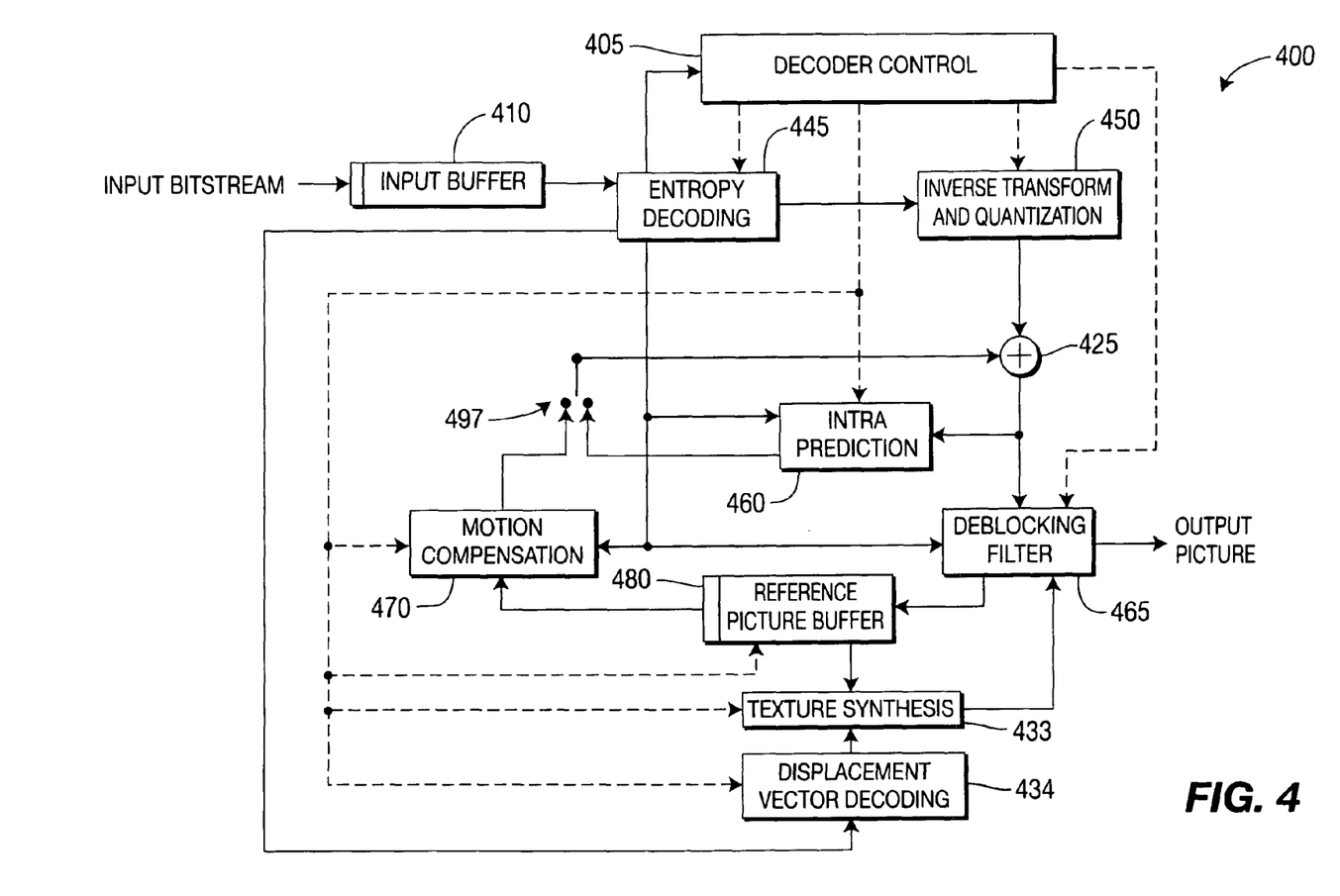
FIG. 4 is a block diagram for an exemplary video decoder to which the present principles can be applied, in accordance with an embodiment of the present principles.

Turning to FIG. 4, a video decoder capable of performing video decoding in accordance with the MPEG-4 AVC standard is indicated by the reference numeral 400.

The video decoder 400 includes an input buffer 410 having an output connected with a first input of the entropy decoder 445. A first output of the entropy decoder 445 is connected with a first input of an inverse transformer and inverse quantizer 450. An output of the inverse transformer and inverse quantizer 450 is connected with a second non-inverting input of a combiner 425. An output of the combiner 425 is connected with a second input of a deblocking filter 465 and a first input of an intra prediction module 460. A second output of the deblocking filter 465 is connected with a first input of a reference picture buffer 480. A first output of the reference picture buffer 480 is connected with a second input of a motion compensator 470. A second output of the reference picture buffer 480 is connected with a first input of a texture synthesizer 433. An output of a displacement vector decoder 434 is connected with a second input of the texture synthesizer 433.

A second output of the entropy decoder 445 is connected with a third input of the motion compensator 470, a first input of the deblocking filter 465, and a second input of the intra prediction module 460. A third output of the entropy decoder 445 is connected with an input of a decoder controller 405. A fourth output of the entropy decoder 445 is connected with and a second input of the displacement vector decoder 434. A first output of the decoder controller 405 is connected with a second input of the entropy decoder 445. A second output of the decoder controller 405 is connected with a second input of the inverse transformer and inverse quantizer 450. A third output of the decoder controller 405 is connected with a third input of the intra predictor 460, a first input of the motion compensator 470, a second input of the reference picture buffer 480, a third input of the texture synthesizer 433, and a first input of the displacement vector decoder 434. A fourth output of the decoder controller 405 is connected with a third input of the deblocking filter 465.

An output of the motion compensator 470 is connected with a first input of a switch 497. An output of the intra prediction module 460 is connected with a second input of the switch 497. An output of the switch 497 is connected with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

Figure 5:
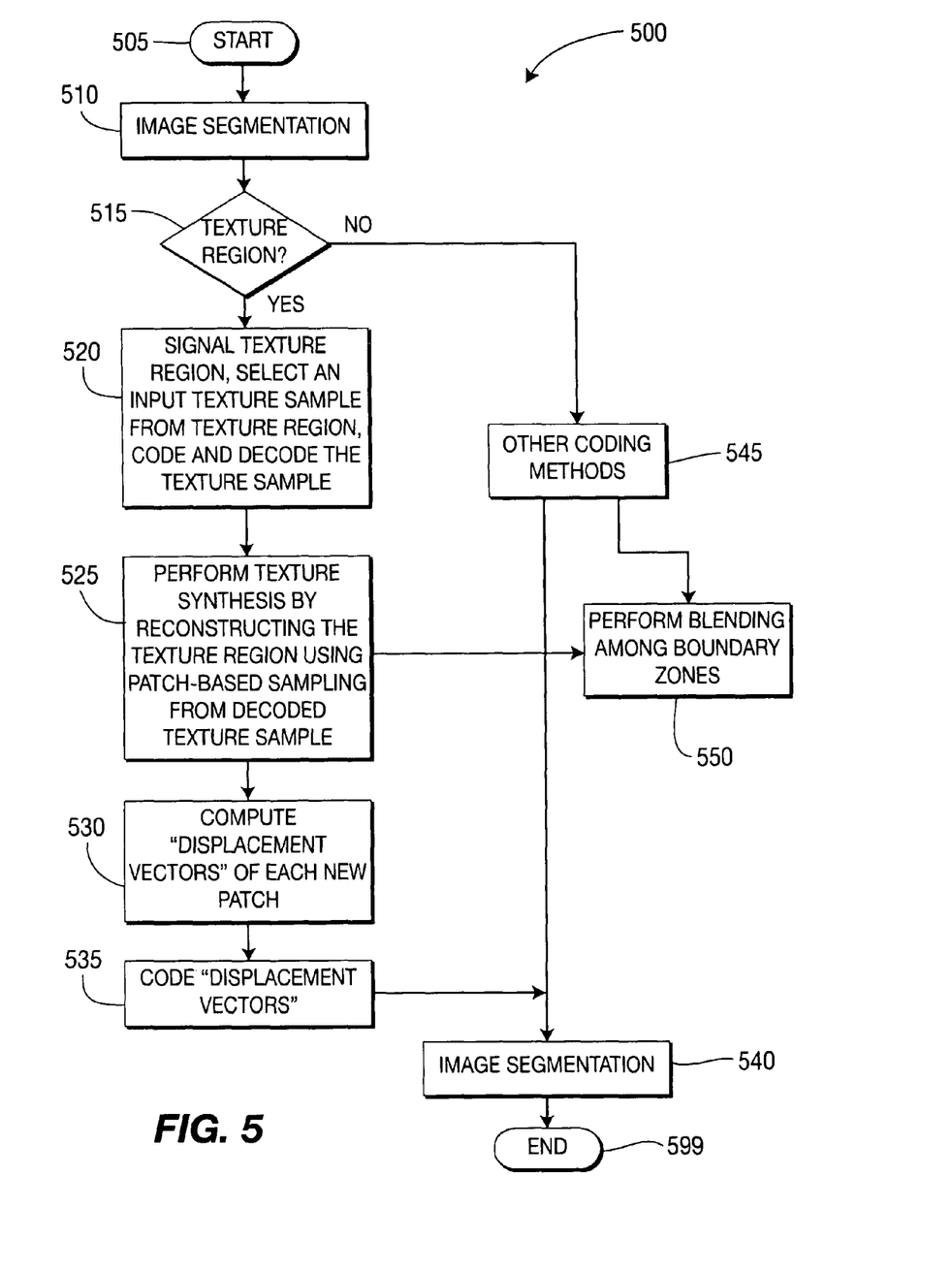
FIG. 5 is a flow diagram for an exemplary video texture encoding method using patch-based sampling texture synthesis, in accordance with an embodiment of the present principles.

Turning to FIG. 5, an exemplary video texture encoding method using patch-based sampling texture synthesis is indicated generally by the reference numeral 500.

The method 500 includes a start block 505 that passes control to a function 510. The function block 510 performs image segmentation on an input image, and passes control to a decision block 515. The decision block 515 determines whether or not a current image segmentation unit (e.g., an image block or an image region) is a texture region. If so, then control is passed to a function block 520. Otherwise, control is passed to a function block 545.

The function block 520 signals a texture region (e.g., using one or more high-level syntax elements), selects an input sample texture $I_{in}$ from the texture region, codes and decodes the input sample texture, and passes control to a function block 525. The function block 525 performs texture synthesis by reconstruct the texture region $B_k$ using patching-based sampling from the decoded sample texture, and passes control to a function block 530 and a function block 550. It is to be appreciated that the patch-based sampling can be performed using any patch-based sampling method including, but not limited to the prior art parch-based sampling described above with respect to steps (a) through (d).

The function block 530 computes, for each patch in the output texture, the corresponding information spatial displacement vector dv, and passes control to a function block 535. The function block 535 codes all the spatial displacement vectors dv, and passes control to a function block 540.

The function block 540 outputs the corresponding data (e.g., coded displacement vectors), and passes control to an end block 599.

The function block 545 uses other coding methods (than those specified with respect to blocks 520 through 535) to code the non-texture region, and passes control to the function block 540.

The function block 550, which performs a decoding operation during encoding, performs blending among boundary zones, and passes control to the function block 545.

Figure 6:
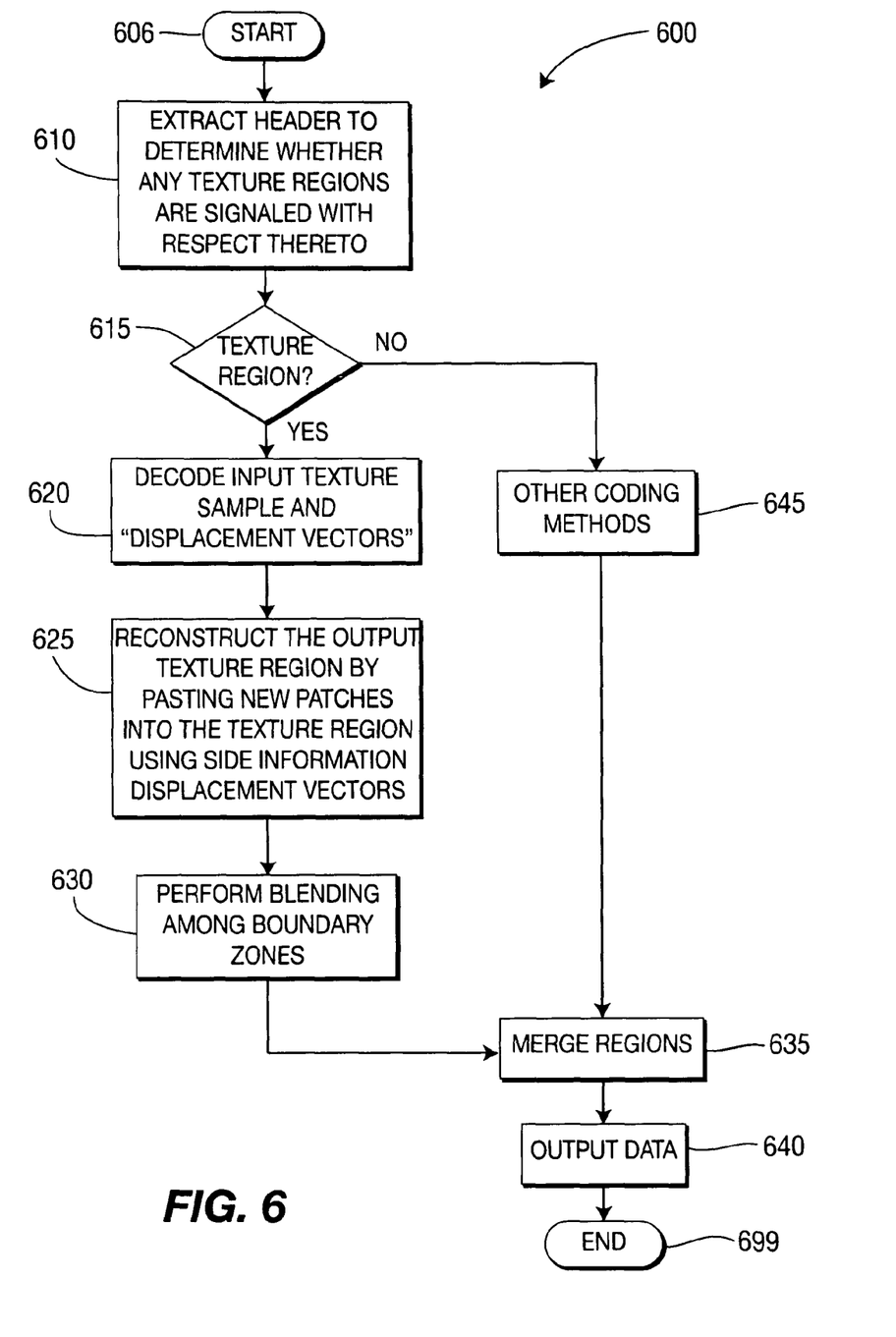
FIG. 6 is a flow diagram for an exemplary video texture decoding method using patch-based sampling texture synthesis, in accordance with an embodiment of the present principles.

Turning to FIG. 6, an exemplary video texture decoding method using patch-based sampling texture synthesis is indicated generally by the reference numeral 600.

The method 600 includes a start block 605 that passes control to a function block 610. The function block 610 extracts a header for a current bitstream and/or packet(s) relating to the bitstream (to determine whether any texture regions are signaled with respect there to), and passes control to a decision block 615. The decision block 615 determines whether or not a current image segmentation unit (e.g., an image block or an image region) is a texture region. If so, then control is passed to a function block 620. Otherwise, control is passed to a function block 645.

The function block 620 decodes the input sample texture $I_{in}$ and all the spatial displacement vectors dv, and passes control to a function block 625. The function block 625 reconstructs the output texture region by pasting patches $B_k$ from the input sample texture using information corresponding to spatial displacement vectors dv, and passes control to a function block 630. The function block 630 performs blending in the boundary zones of up to all patches, and passes control to a function block 635.

The function block 635 merges the texture regions, and passes control to a function block 640. The function block outputs the corresponding data (e.g., decoded texture regions), and passes control to an end block 699.

The function block 545 uses other decoding methods (than those specified with respect to blocks 520 through 530) to decode the non-texture region, and passes control to the function block 635.

It is to be appreciated that the signaling of texture modes in accordance with the present principles can be performed using any signaling technique. For example, as mentioned above with respect to function block 520 of FIG. 5, such signaling can be performing using one or more high level syntax elements. Such syntax elements or any other techniques can simply indicate and/or otherwise specify a relevant mode such as texture mode. Of course, the present principles are not limited to solely the preceding approaches to signaling texture and, thus, other approaches can also be used in accordance with the present principles, while maintaining the spirit of the present principles.

It is to be further appreciated that the blending described above with respect to function block 630 can be performed using any blending technique. For example, in an embodiment, several blending methods can be applied to smooth the transitions among different patches in the boundary zones. As a further example, in an embodiment, one can use the concept of a deblocking filter as related to the MPEG-4 AVC Standard and/or a feathering method. In an embodiment, a feathering method involves using bilinear interpolation (e.g., weighted bilinear interpolation) from the two nearest boundaries or a current boundary and/or boundaries being processed. It is preferable that the same blending method is applied in both the decoding part of the encoder and at the decoder to avoid mismatching. Of course, the present principles are not limited to solely the preceding approaches to blending and, thus, other approaches can also be used in accordance with the present principles, while maintaining the spirit of the present principles.

A description will now be given of some of the many attendant advantages/features of the present invention, some of which have been mentioned above. For example, one advantage/feature is an apparatus that includes an encoder for encoding texture for a picture by synthesizing the texture. The encoder uses information to shift a normally decoding complexity to the encoder when synthesizing the texture using a patch-based sampling method.

Another advantage/feature is the apparatus having the encoder as described above, wherein the information comprises at least one input texture spatial displacement vector that obviates a corresponding texture region search at a corresponding decoder that subsequently decodes the texture for the picture.

Yet another advantage/feature is the apparatus having the encoder as described above, wherein the picture comprises a plurality of regions, and the encoder signals which of the plurality of regions are coded as texture.

Still another advantage/feature is the apparatus having the encoder as described above, wherein the texture is an input sample texture obtained from the picture, and the encoder encodes corresponding information and the input sample texture.

Moreover, another advantage/feature is the apparatus having the encoder as described above, wherein the information is configured to support pasting of texture patches directly into texture regions of the picture at a corresponding decoder.

Further, another advantage/feature is the apparatus having the encoder as described above, wherein the texture is an input sample texture obtained from the picture, and the encoder chooses a plurality of texture patches from the input sample texture, and smoothes transitions in overlapped boundary zones of individual ones of the plurality of texture patches using at least one of deblocking filtering and feathering.

These and other features and advantages of the present principles can be readily ascertained by one of ordinary skill in the pertinent art based on the teachings herein. It is to be understood that the teachings of the present principles can be implemented in various forms of hardware, software, firmware, special purpose processors, or combinations thereof.

Most preferably, the teachings of the present principles are implemented as a combination of hardware and software. Moreover, the software can be implemented as an application program tangibly embodied on a program storage unit. The application program can be uploaded to, and executed by, a machine comprising any suitable architecture. In a presently preferred embodiment, the machine can be implemented on a computer platform having hardware such as one or more central processing units ("CPU"), a random access memory ("RAM"), and input/output ("I/O") interfaces. The computer platform can also include an operating system and microinstruction code. The various processes and functions described herein can be either part of the microinstruction code or part of the application program, or any combination thereof, which can be executed by a CPU. In addition, various other peripheral units can be connected to the computer platform such as an additional data storage unit and a printing unit.

It is to be further understood that, because some of the constituent system components and methods depicted in the accompanying drawings are preferably implemented in software, the actual connections between the system components or the process function blocks can differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles are not limited to those precise embodiments, and that various changes and modifications can be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a processor configured as an encoder for encoding texture for a picture by synthesizing the texture, wherein the texture is an input sample texture obtained from the picture, and said encoder uses information representing an input texture spatial displacement vector to shift a decoding operation to the encoder when synthesizing the texture using a patch-based sampling method, the input texture spatial displacement vector having its reference picture to be the input sample texture, and said encoder chooses a plurality of textures patches from the input sample texture, and smoothes transitions in overlapped boundary zones of individual ones of the plurality of textures patches using at least one of deblocking filtering and feathering.

2. The apparatus of claim 1, wherein the information comprises at least one input texture spatial displacement vector that obviates a decoding operation of performing a corresponding texture region search at a decoder that can decode the texture for the picture.

3. The apparatus of claim 1, wherein the picture comprises a plurality of regions, and said encoder signals which of the plurality of regions are coded as texture regions.

4. The apparatus of claim 1, wherein the texture is an input sample texture obtained from the picture, and said encoder encodes the information and the input sample texture.

5. The apparatus of claim 1, wherein the information is configured to support pasting of texture patches directly into texture regions of the picture at a corresponding decoder.

6. A method, comprising:
   encoding texture for a picture by synthesizing the texture, wherein the texture is an input sample texture obtained from the picture, and wherein said encoding step uses information representing an input texture special displacement vector to shift a decoding operation to the encoder when synthesizing the texture using a patch-based sampling method, the input texture special displacement vector having its reference picture to be the input sample texture, said encoding comprising:
   choosing a plurality of textures patches from the input sample texture; and
   smoothing transitions in overlapped boundary zones of individual ones of the plurality of texture patches using at least one of deblocking filtering and feathering.

7. The method of claim 6, wherein the information comprises at least one input texture spatial displacement vector that has said encoder perform a texture region search.

8. The method of claim 6, wherein the picture comprises a plurality of regions, and the method further comprises signaling which of the plurality of regions are coded as texture.

9. The method of claim 6, wherein the texture is an input sample texture obtained from the picture, and said encoding step comprises encoding the information and the input sample texture.

10. The method of claim 6, wherein the information is configured to support pasting of texture patches directly into texture regions of the picture at a corresponding decoder.

11. An apparatus, comprising:
   A processor configured as a decoder for decoding texture for a picture by synthesizing the texture, wherein the texture is an input sample texture obtained from the picture, and said decoder uses information representing an input texture spatial displacement vector to shift a decoding operation from said decoder to an encoder when synthesizing the texture using a patch-based sampling method, the input texture spatial displacement vector having its reference picture to be the input sample texture, and said decoder chooses a plurality of textures patches from the input sample texture, and smoothes transitions in overlapped boundary zones of individual ones of the plurality of textures patches using at least one of deblocking filtering and feathering.

12. The apparatus of claim 11, wherein the information comprises at least one input texture spatial displacement vector that obviates a corresponding texture region search at said decoder.

13. The apparatus of claim 11, wherein the picture comprises a plurality of regions, and said decoder determines which of the plurality of regions are coded as said texture based on received signaling.

14. The apparatus of claim 11, wherein the texture is an input sample texture obtained from the picture, and said decoder decodes the information and the input sample texture.

15. The apparatus of claim 11, wherein the information is configured to support pasting of texture patches directly into texture regions of the picture at said decoder.

16. A method, comprising:
   decoding texture for a picture by synthesizing the texture, wherein the texture is an input sample texture obtained from the picture, and wherein said decoding step uses information representing an input texture special displacement vector to shift a decoding operation to the encoder when synthesizing the texture using a patch-based sampling method, the input texture special displacement vector having its reference picture to be the input sample texture, said decoding comprising:
   choosing a plurality of textures patches from the input sample texture; and
   smoothing transitions in overlapped boundary zones of individual ones of the plurality of texture patches using at least one of deblocking filtering and feathering.

17. The method of claim 16, wherein the information comprises at least one input texture spatial displacement vector that obviates a corresponding texture region search.

18. The method of claim 16, wherein the picture comprises a plurality of regions, and the method further comprises determining which of the plurality of regions are coded as texture regions based on said information.

19. The method of claim 16, wherein information is configured to support pasting of texture patches directly into texture regions of the picture during said decoding step.

* * * * *